(12) United States Patent
Lokkinen

(10) Patent No.: US 10,427,223 B2
(45) Date of Patent: *Oct. 1, 2019

(54) DEVICE FOR OPENING CONNECTION TO LINED PIPE

(71) Applicant: Picote Solutions Inc., Sammamish, WA (US)

(72) Inventor: Mika Lokkinen, Tallinn (EE)

(73) Assignee: Picote Solutions Inc., Sammamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,426

(22) Filed: Dec. 22, 2018

(65) Prior Publication Data

US 2019/0118270 A1 Apr. 25, 2019

Related U.S. Application Data

(63) Continuation of application No. 15/657,125, filed on Jul. 22, 2017, now Pat. No. 10,207,335.

(51) Int. Cl.
*B23B 51/00* (2006.01)
*B23B 41/00* (2006.01)
*B23B 51/08* (2006.01)
*B23C 3/12* (2006.01)

(52) U.S. Cl.
CPC ............ *B23B 51/009* (2013.01); *B23B 41/00* (2013.01); *B23B 51/08* (2013.01); *B23B 2215/72* (2013.01); *B23B 2251/04* (2013.01); *B23B 2251/127* (2013.01); *B23B 2251/204* (2013.01); *B23B 2251/285* (2013.01); *B23C 3/124* (2013.01); *Y10T 408/906* (2015.01)

(58) Field of Classification Search
CPC ... B23B 51/0054; B23B 51/009; B23B 51/08; B23B 2215/64; B23B 2215/72; B23B 2251/204; B23B 2251/285; B23C 3/122; B23C 3/124; B23C 5/006; B23C 2220/52; B23C 3/02

See application file for complete search history.

(56) References Cited

U.S. PATENT DOCUMENTS

| | | | | |
|---|---|---|---|---|
| 2,478,310 A | * | 8/1949 | Payne | ..................... B23B 3/265 |
| | | | | 408/80 |
| 4,442,891 A | * | 4/1984 | Wood | ....................... E03F 3/06 |
| | | | | 166/55.2 |
| 4,648,454 A | * | 3/1987 | Yarnell | .................. B23B 41/00 |
| | | | | 166/297 |
| 4,893,389 A | * | 1/1990 | Allen | .................... F16L 55/179 |
| | | | | 138/98 |

(Continued)

*Primary Examiner* — Alan Snyder
*Assistant Examiner* — Yasir A Diab
(74) *Attorney, Agent, or Firm* — Fasth Law Offices; Rolf Fasth

(57) ABSTRACT

A device for opening a connection to a lined pipe is disclosed. The device has a body that includes a front end and a rear end and being rotatable about a rotation axis. The device also has a drill head that has multiple cutters for puncturing and enlarging a hole in a liner, and multiple side cutters have at least one cutting edge parallel to the rotation axis. A safety ring is disposed on the body between the drill head and the side cutters. The safety ring has a circular periphery extending beyond the drill head and the side cutters in a direction perpendicular to the rotation axis.

2 Claims, 4 Drawing Sheets

(56) References Cited

U.S. PATENT DOCUMENTS 5,540,613 A * 7/1996 Kamiyama ........... F16L 55/265
　　　　　　　　　　　　　　　　　　　　　451/151
6,187,105 B1 * 2/2001 Matlschweiger ....... E03F 9/005
　　　　　　　　　　　　　　　　　　　　　134/8

* cited by examiner

DEVICE FOR OPENING CONNECTION TO LINED PIPE

PRIOR APPLICATION

This is a continuation application of U.S. patent application Ser. No. 15/657,125, filed 22 Jul. 2017.

FIELD OF THE INVENTION

The present invention relates to pipe renovation tools and in particular to a device for opening a connection to a lined pipe.

BACKGROUND AND SUMMARY OF THE INVENTION

Pipes, such as water and sewage pipes, approaching the end of their service life may be renovated e.g. by lining or coating the inside of an old pipe or by mounting a new pipe into an old pipe. An epoxy resin-impregnated polyester liner, for example, that is inverted into a pipe to be renovated using compressed air or water can be used in lining. After inversion of the liner into the pipe, excess pressure is maintained inside the liner until the epoxy resin cures to its shape conforming to the walls of the old pipe. Modern technology allows even highly complex pipes to be lined.

One of the problems with solutions of the prior art is reinstating connections in a pipeline when a pipe of the pipeline has been lined. The liner typically covers the whole inner surface of the old pipe that was lined and blocks all connections, e.g. from lateral pipes to a lined main pipe. Typically, these connections are opened with a robot cutter that is transported in to the main line and operated manually. A camera of the robot is used for finding the lateral connection and a cutting head is operated to cut the liner blocking the connection while monitoring the process with the camera. This method is slow and risky because an operator of the robot can accidentally hit the liner with the cutting head outside of the connection and expose the old pipe behind the liner. The use of the robot cutter also requires that the main pipe where the robot operates is large enough and straight enough because the robots are bulky and cannot move through tight bends in the pipe.

It is an object of the present invention to present a device that allows safer and/or faster opening of a connection to a lined pipe than the prior art solutions.

BRIEF DESCRIPTION OF THE DRAWINGS

In the following, the present invention is described in greater detail by means of preferred embodiments with reference to the accompanying drawings, in which.

DETAILED DESCRIPTION OF THE INVENTION

Renovation of pipelines in buildings, such as residential buildings, offices and industrial plants, using CIPP (Cured In-Place Pipe) pipe lining method has become common in recent years. The CIPP industry has evolved from leak repairs where a short piece of liner was installed to repair a leaking part of an existing pipe to lining of main lines only to full renovations where every pipe and connection is lined creating a complete new pipeline inside the existing old pipeline. A full renovation requires lining of pipes in various sizes, usually through multiple bends and including a lot of connections.

Figure 1:
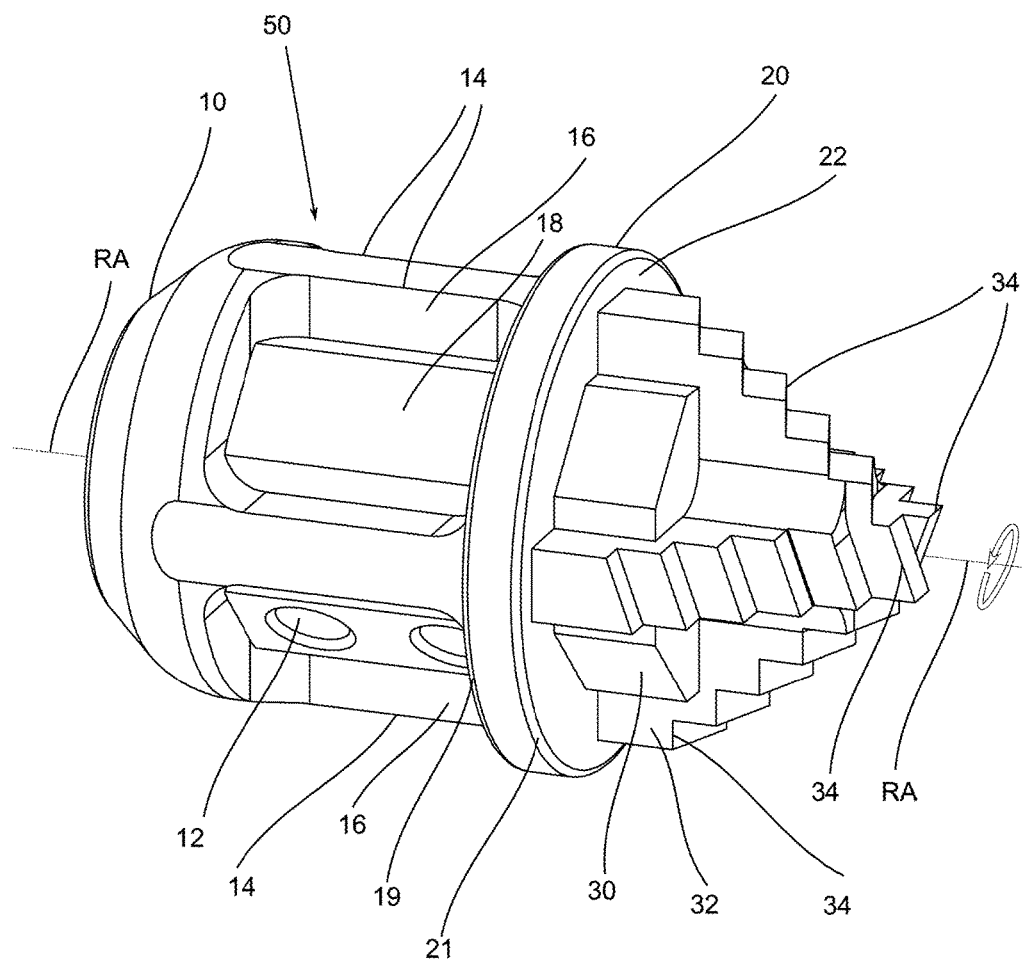
FIG. 1 shows an isometric presentation of a device according to an embodiment of the present invention.
Figure 2:
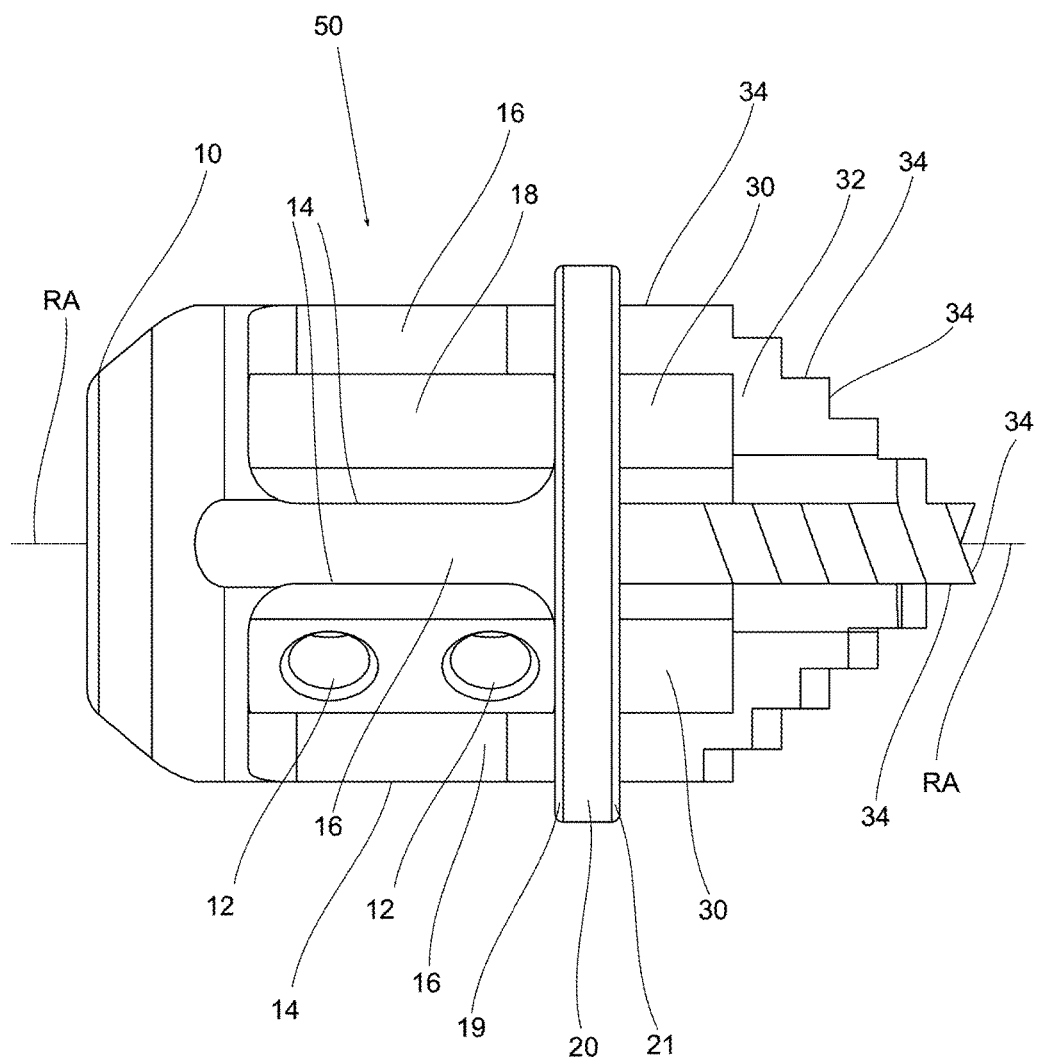
FIG. 2 shows a device according to an embodiment of the present invention from a direction normal to a rotation axis of the device.
Figure 3:
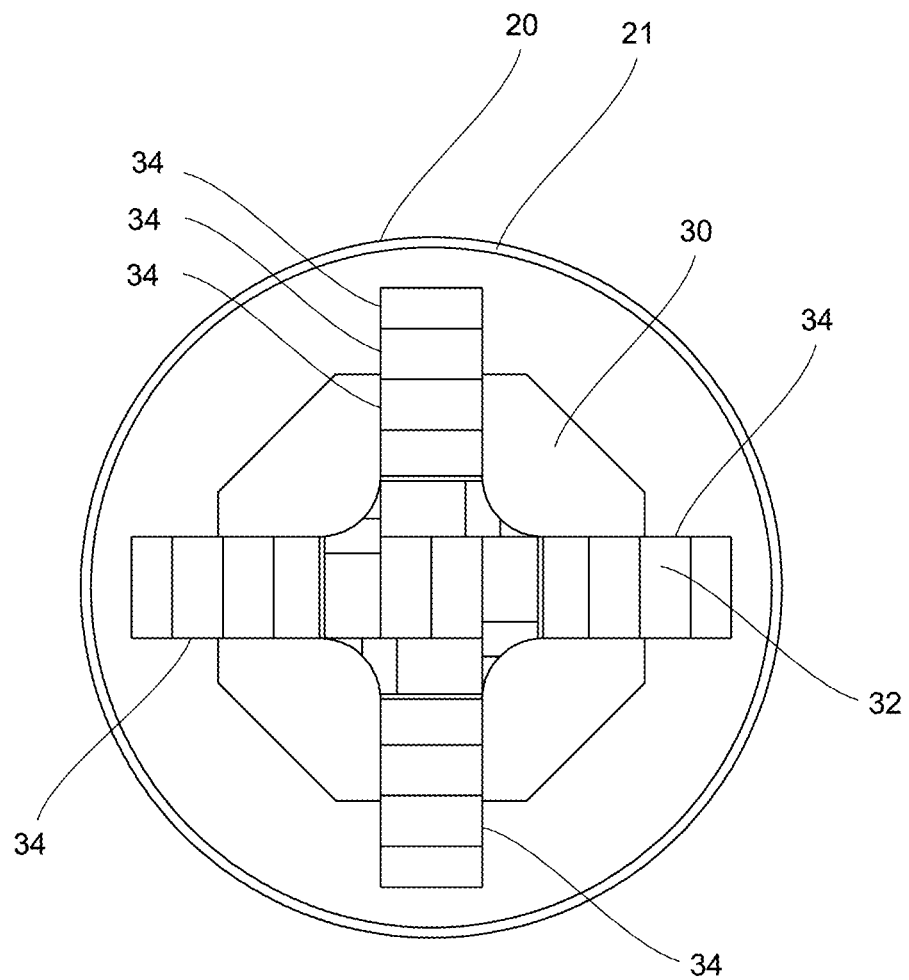
FIG. 3 shows a device according to an embodiment of the present invention in a direction of the rotation axis.
Figure 4:
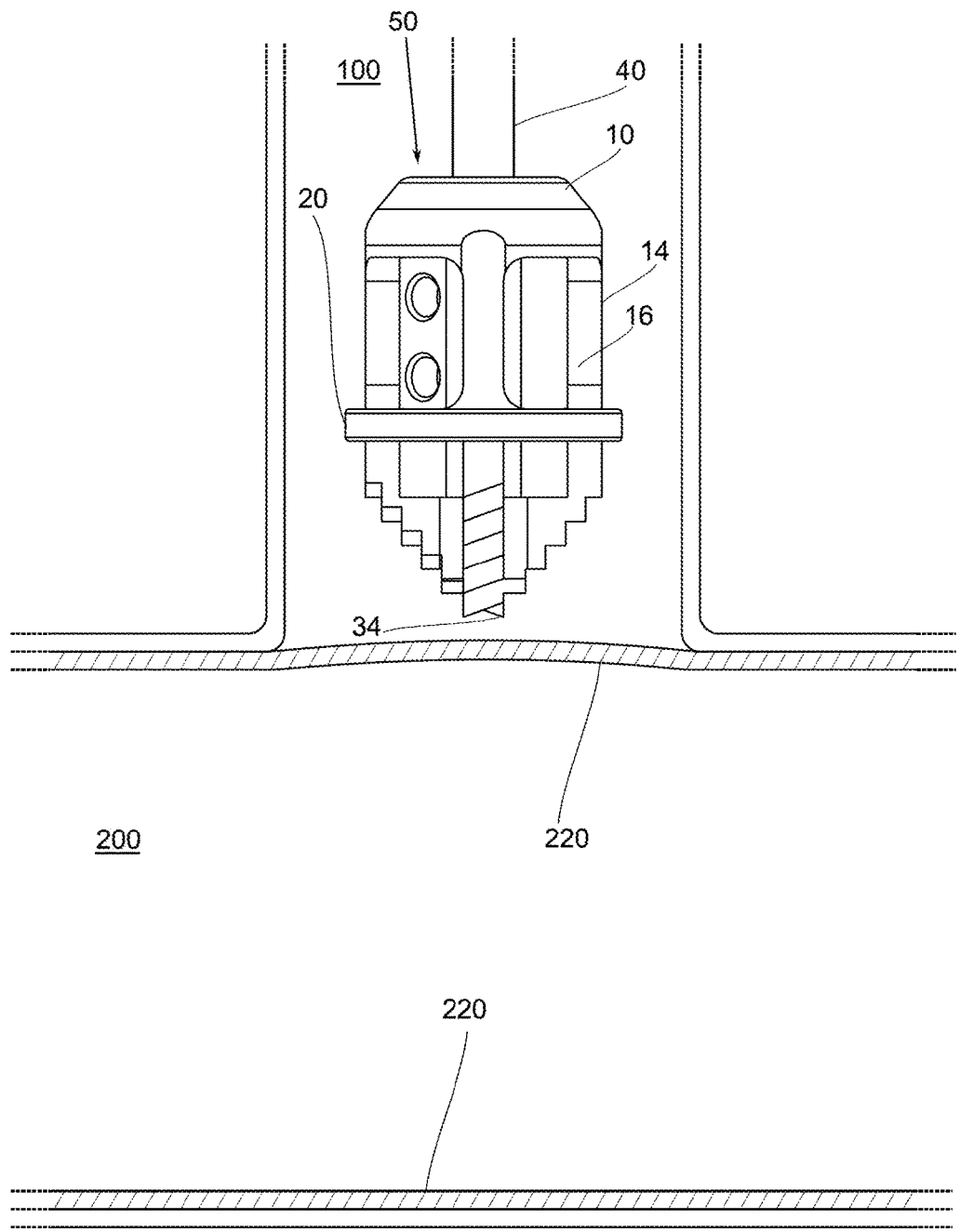
FIG. 4 shows a device according to an embodiment of the present invention in a pipeline.

FIG. 1 shows a device 50 according to an embodiment of the present invention for opening a connection to a lined pipe. FIG. 2 and FIG. 3 show the device from different angles. FIG. 4 shows an example of where the device can be used by placing the device in a lateral pipe 100. The lateral pipe 100 connects to a main pipe 200 which is lined with a liner 220. The device 50 is attached to a flexible rotation shaft 40 and pushed with the shaft 40, through the lateral line 100, towards the liner 220 of the main pipe 200 for opening a connection from the lateral pipe 100 to the main pipe 200.

The device 50 of the embodiment in FIG. 1 has a body rotatable about a rotation axis RA and has a front end and a rear end opposite to the front end. A shaft socket is provided on the rear end of the device. The shaft socket may have a cavity or a hole defined therein for accommodating or receiving a shaft 40 and threaded holes 12 through the body into said cavity or said hole. Preferably, the shaft 40 is pushed into the cavity or hole and secured with screws through the threaded holes 12. Once the shaft 40 is secured to the device 50, rotation of the shaft 40 rotates the device 50.

A drill head 32 is provided at the front end of the body and the drill head has multiple cutters for puncturing and enlarging a hole in the liner 220. The drill head 32 at the front end of the body preferably has four step-wise tapered cutters. Each of these cutters has multiple cutting edges 34 parallel to the rotation axis and multiple cutting edges 34 perpendicular to the rotation axis. The step-wise tapered construction of the drill head 32 punctures a hole and enlarges the punctured hole step-by-step thereby reducing torsional forces to the shaft compared to a drill head with a larger contact area. The device enlarges the hole to a size (diameter) larger than the diameter of the drill head because the sharp-edged front drill head bounces around the edges of the hole chipping away the liner instead of drilling smoothly. Spacers 30 can be disposed between adjacent cutters of the drill head 32 to prevent the drill head from cutting too deep which could cause excess bouncing of the device or jamming of the device. The spacers 30 fill the space between the cutters of the drill head 32 thereby limiting a maximum cutting depth to a distance between the spacer and a cutting edge 34 of the cutter.

The device also has multiple side cutters 16 on the peripheral surfaces of the body between the front end and the back end. Each of the side cutters 16 has at least one cutting edge 14 that extends along the body and parallel to the rotation axis RA. After puncturing a hole to the liner 220 with the drill head and enlarging it with the drill head to fit the device 50 through the hole, the side cutters 16 are, preferably, used to cut away the rest of the liner blocking the connection. When rotating the device halfway through the hole in the liner, the device bounces around the hole and the side cutters 16 chip away the rest of the liner until diameter of the hole matches diameter of the lateral pipe 100, i.e. the connection is fully opened to the main pipe 200. Preferably, each side cutter 16 has one or two right-angled cutting edges 14 parallel to the rotation axis RA. Spacers 18 can be disposed between adjacent side cutters 16 to prevent the side cutters 16 from cutting too deep which could cause excess bouncing of the device or jamming of the device. The spacers 18 fill the space between the side cutters 16 thereby limiting a maximum cutting depth to a distance between the spacer 18 and a cutting edge 14 of the side cutter 16.

The device 50 has a safety ring 20 disposed on a round peripheral surface of the the body between the drill head 32 and the side cutters 16. The safety ring 20 is preferably an integral part of the body and the safety ring 20 has a circular periphery extending beyond the drill head 32 and the side cutters 16 in a direction perpendicular to the rotation axis. In other words, the safety ring 20 has a larger diameter than any other part on the body and extends radially outwardly from the body. The circular peripheral outer surface of the safety ring 20 is smooth so it does not cause or amplify the bouncing of the device in a pipe. On straight sections of the pipe, preceding a connection area in the pipe, only the safety ring 20 and possibly also the chamfered rear end 10 of the device can be in contact with the inner surface of the pipe. Preferably, the rear end 10 is tapered and also the safety ring 20 has one or two short tapered or chamfered sections 19, 21 on one or both annular edges and a flat section parallel to the rotation axis in the middle, i.e. between said tapered sections 19, 21. Since these smooth, annular and preferably tapered sections, i.e. the rear end 10 and the safety ring 20, of the device 50 are the only parts in contact with the inner surface of the pipe, the device 50 is safe to use even in plastic pipes, such as PVC and PE pipes. The device can also be used in a pipe that has already been lined because the installed liner will not be damaged. The design of the device to include the safety ring 20 between the side cutters 16 and cutters of the drill head 32 prevents any cutting edges from accidentally contacting the inner surface of the pipe. The cutting edges 14, 34 only make contact with a liner of the main pipe 200 in a connection area where the liner is blocking the lateral pipe 100 from where the connection between the two pipes can be opened with the device 50.

It is surprisingly easy to drill a hole in a liner by using the device of the present invention and to push the safety ring through the hole in the liner even though it looks like a challenging task based on the appearance of the device. The safety ring can be designed so that it is large enough to ensure that the lateral pipe 100 itself is not damaged by the device but still the device can be quickly and easily drilled through the liner at the end of the lateral pipe so that the safety ring is disposed inside the main pipe 200. Also, the device can be significantly smaller in diameter than the lateral pipe 100 in which the device operates. Thereby, it is easy to navigate to the connection area of the lateral pipe 100 and the main pipe 200 even through multiple tight bends in the lateral pipe by simply pushing the device 50 forward in the lateral pipe with the rotation shaft 40. Even though the device is smaller in diameter than the inner diameter of the lateral pipe and the hole needed in the liner, the side cutters 16 quickly enlarge the hole in the liner to the desired size without a risk of removing too much of the liner. The small tapered sections 19, 21 of the safety ring 20 facilitate the pushing of the device through the initial hole made by the drill head 32 and also the pulling of the device back through the fully opened connection so that the safety ring is again in the lateral pipe 100.

The device, i.e. an entity of the body, the side cutters 16, the safety ring 20 and the drill head 32, is preferably machined from a single piece or cast as a single piece and preferably annealed to reduce dulling of the cutting edges 14, 34. Preferably, the device is made of steel and annealed.

The number of the cutters of the drill head 32 may be other than four and it is also possible to use a device that has one, two, three, five, six or eight cutters. As a rule of thumb, the larger the device, the more cutters may be needed for optimal performance. If necessary, even more cutters may be used. The same applies to the side cutters 16. However, four drill head cutters and four side cutters has been found to perform well in e.g. 100 mm/4 inch pipes.

The rotation shaft 40 used with the device is a rotation shaft that is flexible but stiff in thrust, such as a steel cable. The rotation shaft is, preferably, provided with a cover tube at least partly surrounding it, the cover tube is not fastened to the rotation shaft so as to allow taking a hold of the cover tube and so that it does not revolve as the rotation shaft rotates. The cover tube allows the rotation shaft and the device fastened to an end thereof to be guided in the pipe in a desired manner. The rotation shaft can be rotated with e.g. electric, hydraulic or pneumatic motor.

FIG. 4 shows a device according to an embodiment in a lateral pipe from which the device may be used to open a connection to a main pipe 200 by removing a piece of the liner 220 from the connection area. The lateral pipe has an inner diameter substantially greater than the outer diameter of the device. The diameter of the device may be understood to refer to the greatest dimension perpendicular to the rotation axis RA, i.e. the outer diameter of the safety ring 20. The length of the device may be understood to refer to the greatest length in the direction of the rotation axis, i.e. the length from the rear end of the device to the tip of the drill head in the front end of the device. The dimensioning of the device in relation to the size of the pipe to be milled affects the behavior of the device in the pipe. For the device to rotate in a pipe without damaging the pipe itself, the diameter and length of the device should be in specific proportions to one another and to the inner diameter of the pipe. Also, equally important is the diameter of the safety ring vs. maximum distance between two cutting edges 34 of the drill head 32 and/or maximum distance between two cutting edges 14 of the side cutters 16.

It has been observed that a preferred diameter of the device is 40 to 70% of the inner diameter of the pipe and particularly preferably the device diameter is 50 to 60% of the inner diameter of the pipe. A preferred length of the device is 70 to 200% of the inner diameter of the pipe and particularly preferably the device length is 80 to 150% of the inner diameter of the pipe. A preferred diameter of the device is at least 30% of the length of the device and particularly preferably the diameter of the device is at least 40% of the length of the device. A preferred diameter of the device is at most 80% of the length of the device and particularly preferably the diameter of the device is at most 70% of the length of the device. For example, a device fitting into a pipe having an inner diameter of 100 mm might have e.g. a diameter of 55 mm and a length of 100 mm.

Preferably, the safety ring 20 extends at least 5% further away from the rotation axis RA than any cutting edge 14, 34 in a direction perpendicular to the rotation axis, i.e. the safety ring 20 has a radius that is at least 5% greater than the radius of the cutting edges 14, 34. In an embodiment, the safety ring 20 can extend at least 2%, at least 8%, at least 10% or from 2% to 10% further away from the rotation axis than any cutting edge 14, 34 in a direction normal to the rotation axis.

Regardless of the ratio between distances of cutting edges and safety ring from the rotation axis, the safety ring extends or protrudes at least 1 millimeter further away from the rotation axis RA than any cutting edge in a direction perpendicular to the rotation axis, i.e. the safety ring 20 has a radius that is at least 1 mm greater than the radius of the cutting edges 14, 34. In an embodiment, the safety ring can extend at least 2 mm, at least 3 mm, at least 5 mm or from 1 mm to 5 mm further away from the rotation axis RA than any cutting edge in a direction normal to the rotation axis.

In addition to the dimensions of the device, also the stiffness of the rotation shaft 40 used has an essential influence on an optimal diameter and length of the device. Therefore, the proportions given may differ for specific rotation shafts from those disclosed here. The ratio of the diameter and length of the device to the inner diameter of the pipe in which the device operates, together with the stiffness of the rotation shaft, should provide safe operation in which the cutting edges of the device is unable hit the pipe walls in a straight segment of the pipe so as to maintain the pipe substantially undamaged to allow renovation by lining also the lateral pipe to be carried out. In addition, the device should be able to advance in the bends of the pipe without substantially damaging the pipe itself even at a bend of the pipe to be relined.

It is apparent to a person skilled in the art that the above exemplary embodiments are rather simple in structure and operation for the purposes of illustration. By following the model shown in this patent application, it is possible to construct different and even very complex solutions that utilize the inventive idea disclosed in this patent application.

The invention claimed is:

1. A device having a drill head for opening a connection to a lined pipe, the drill head being rotatable about a rotation axis, comprising:
   four step-wise tapered cutting edges disposed at a front end of the device for puncturing and enlarging a hole in a liner,
   each of the four step-wise tapered cutting edges having multiple cutting edges parallel to the rotation axis and multiple cutting edges perpendicular to the rotation axis; and
   spacers being disposed between the four step-wise tapered cutting edges of the drill head for reducing cutting depth of the cutters.

2. The device according to claim 1 wherein the drill head has a safety ring attached to the drill head, the safety ring having a circular peripheral surface extending beyond said four step-wise tapered cutters in a direction perpendicular to the rotation axis.

* * * * *